April 8, 1958     D. F. ELWELL ET AL     2,829,522
SENSITIVE INSTRUMENTS

Filed June 4, 1956     2 Sheets-Sheet 1

INVENTOR.
DONALD F. ELWELL
ALAN M. SOUDER
BY
Roger W. Jensen
ATTORNEY

April 8, 1958 D. F. ELWELL ET AL 2,829,522
SENSITIVE INSTRUMENTS

Filed June 4, 1956 2 Sheets-Sheet 2

INVENTOR.
DONALD F. ELWELL
ALAN M. SOUDER
BY Roger W. Jensen

ATTORNEY

United States Patent Office 2,829,522
Patented Apr. 8, 1958

2,829,522

SENSITIVE INSTRUMENTS

Donald F. Elwell, Columbia Heights, and Alan M. Souder, St. Anthony Village, Minn., assignors to Minneapolis-Honeywell Regulator Company, Minneapolis, Minn., a corporation of Delaware Application June 4, 1956, Serial No. 589,148

10 Claims. (Cl. 74—5.6)

This invention pertains to sensitive instruments and may be specifically applied to gyroscopic apparatus and more specifically to a single degree of freedom or rate gyroscope. A rate gyroscope generally comprises a rotor supported for rotation about a spin axis on a rotor supporting gimbal with the gimbal being supported for rotation about an output axis on a base member, the rotor supporting gimbal being centered relative to the base by spring means which elastically resist any deviation of the gimbal away from its normal position. The output axis of the gyroscope is at right angles to the spin axis of the rotor and this apparatus will respond to movement of the structure about its input axis which is defined as the axis normal to both the spin axis and the output axis. Thus, angular movement of the gyro about the input axis will cause the gyro to precess about its output axis against the restraint of the centering spring means. The amount of deviation of the gimbal away from its center or normal position is a measure of the rate of turn about the input axis.

Rate gyroscopes of the type described above are adapted to be mounted on vehicles so as to sense the rate of turn of the vehicle about its various turning axes. For example, it is customary at the present time to use a total of three rate gyroscopes in automatic pilots for aircraft to sense the rate of turn of the aircraft about its three axes. Thus, the three rate gyroscopes are oriented so that their respective input axes coincide with the lateral, longitudinal, and the yaw axes of the aircraft so as to measure the rate of turn of the aircraft about those axes. One source of error in using a rate gyroscope as described above is known in the art as "cross coupling." "Cross coupling" may be defined as the response of a rate gyroscope to rate of turn of the aircraft about an axis normal to the input axis. At the condition of no input, this normal axis is equivalent to the spin axis. To explain, assume a rate gyroscope having its spin axis parallel with the longitudinal axis of an aircraft and with its output axis parallel to the lateral axis of the aircraft. The input axis then is parallel to the yaw axis of the aircraft and any rate of turn about the yaw axis will result in a precession of the gyroscope about its output axis so as to produce a signal indicative of rate of turn about the yaw axis. However, as soon as the rotor gimbal precesses about its output axis the spin axis no longer is parallel to the longitudinal axis of the aircraft. As long as the spin axis was parallel to the longitudinal axis of the aircraft then any rate of turn about the longitudinal or "roll" axis of the aircraft would not affect the gyroscope. Now, however, with the rotor gimbal precessed away from its normal position, rate of turn of the aircraft about its longitudinal axis will be sensed by the gyroscope and affect the output signal thereof. It will be appreciated that the error of cross coupling is proportional to the sine of the angle of the gimbal away from its normal position. It follows therefore that in order to minimize the effects of cross coupling it is desirable to keep the amount of gimbal travel as small as is possible consistent with satisfactory operation.

Another consideration in rate gyros is the generation of a suitable output signal by the signal generator pickoff. Relatively high power pickoffs generally must have an appreciable, relative movement between the two parts thereof so as to obtain a useable output signal. This is especially true in potentiometer type pickoffs comprising in part a resistive portion and a wiper member. Simply stated, to obtain a useable signal in a pickoff of this type it is necessary to have an appreciable displacement between the two relatively movable parts of the pickoff.

Thus, in a rate gyroscope having a signal generator pickoff, there are two problems the solutions of which are opposed to one another. On the one hand, it is desirable to keep gimbal travel or excursions as small as possible in order to minimize "cross coupling" and at the same time it is desirable to have a maximum amount of relative movement between the two parts of the pickoff in order to have a useable output signal. The present invention is concerned with a solution to both problems and permits the gimbal movement to be mechanically amplified so that the gimbal angular movement may be quite small in comparison to the angular movement of the pickoff. In addition, the present invention provides a construction which enables the pickoff axis to be at right angles to the output axis of the gyroscope which permits a much more compact type of construction in the gyroscope thus making the gyroscope smaller, lighter, and otherwise more desirable.

It can be appreciated that a connecting linkage across the right angles mentioned above must accomplish the unbinding motion of a double universal joint (pair of Hooke joints) but must be frictionless and backlash free for proper gyro operation.

The heart of the present invention lies in the unique linkage between the gimbal frame of the gyroscope and the movable part of the pickoff. The unique linkage is frictionless, has no backlash and provides a very good frequency response. Further, the linkage is finely adjustable so that the mechanical amplification between the gimbal frame and the wiper arm may be easily changed. In addition, the linkage is extremely rugged and is capable of sustaining very severe shocks. These characteristics are of utmost importance in modern day aircraft which are subject to extreme shocks due to gunfire and vibration of the airframe caused by the high speeds of these aircraft.

An object of this invention therefore is to provide an improved sensitive instrument apparatus.

A further object of the invention is to provide a compact and rugged linkage between the rotor gimbal frame and the movable member of the signal generator pickoff of a rate gyroscope which permits fine adjustments of the mechanical amplification of the gimbal rotation and the rotation of the two parts of the pickoff.

Other objects of the invention will be set forth more fully in and become apparent from a reading of the following specification and appended claims, in conjunction with the accompanying drawings in which:

Figure 1:
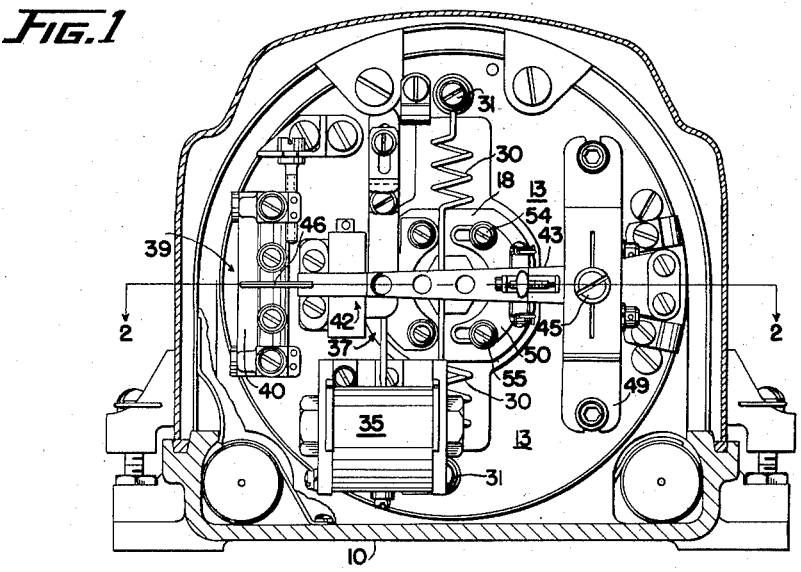
Figure 1 is a cross-sectional view of a rate gyroscope in which our improved apparatus is used.
Figure 2:
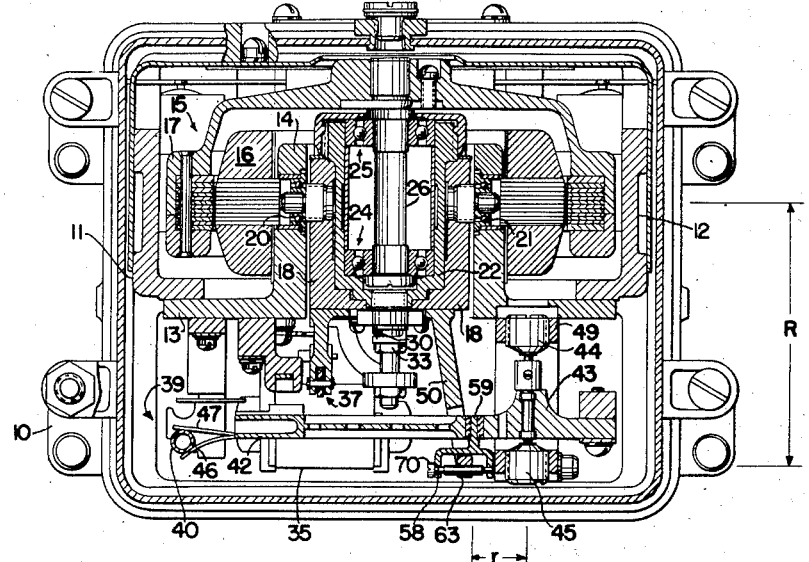
Figure 2 is a cross-section taken along section lines 2—2 of Figure 1.

The gyroscopic apparatus shown in Figures 1 and 2 includes a base member 10 having a pair of upstanding portions 11 and 12. A support plate 13 is secured by suitable means, not shown, to upstanding portions 11 and 12 of base member 10. Support plate 13 has a central hollow boss portion 14 on the outside of which is secured by suitable means the stator member 16 of a gyro spin motor 15 having a rotor assembly 17. A gimbal block or rotor support 18 is supported for limited rotation inside of and relative to boss portion 14 about an output axis comprising a pair of bearings 20 and 21 mounted in boss portion 14 of the support plate 13. A hollow cylindrical rotor housing member 22 is positioned in a suitable recess in gimbal block 18 and has positioned therewithin a pair of bearings 24 and 25, the outer races of which fit snugly into housing member 22 and the inner races of which support a rotor shaft 26. Rotor shaft 26 is an integral part of said rotor assembly 17 of the gyro spin motor 15. Bearings 24 and 25 thus define the gyro spin axis and it will be noted in Figure 2 that the spin axis so defined is substantially normal to the output axis defined by bearings 20 and 21.

Suitable coil means, not shown, are provided in stator member 16 of the spin motor 15 and are adapted to be suitably energized so as to set up a rotating flux field which will coact with rotor member 17 so as to cause it to spin at high speeds. The design of stator member 16 and rotor member 17 of the spin motor 15 is such that limited rotation of rotor member 15 about the output axis is permitted without contact between the stator 16 and rotor 17.

The input axis for the rate gyroscope as viewed in Figure 2, is perpendicular to the plane of the drawing. Thus, turning of the gyro about its input axis results in the rotor precessing about its output axis within its limits defined by stop means not shown. A centering spring member 30 is fastened at its extremities by suitable means such as screws 31 to support plate 13 and is clamped at its center to the gimbal block 18 by a clamping nut 33. Spring 30 serves to restrain the gimbal block 18 from being rotated away from its normal position and returns gimbal block 18 to its original or normal position once the turning about the input axis of the gyro has ceased. A viscous damper member 35 is connected to gimbal block 18 through suitable means including a linkage assembly 37 and serves to damp movements of the gimbal block 18 about the output axis defined by bearings 20 and 21 relative to the support plate 13.

A signal generator pickoff means 39 is provided which develops a signal proportional to the rate of turn about the input axis and comprises a fixed resistive portion 40 suitably secured to support plate 13 and a movable wiper arm assembly 42. Wiper arm assembly 42 comprises an insulative arm 43 which is pivoted in a pair of bearings 44 and 45 which are in turn mounted in a bearing bracket 49 secured to support plate 13 by suitable means. Thus, the wiper arm assembly 42 is supported for rotation about a pickoff axis defined by bearings 44 and 45 which, it will be noted, is normal to the output axis defined by bearings 20 and 21. The wiper arm assembly 42 further includes a pair of wipers 46 and 47 which contact the resistive portion 40 of the pickoff and are connected by suitable means such as flexible leads or slip rings and terminal means, not shown, to external controlled means, not shown. It will be further understood that the resistive member 40 of the pickoff is also connected by wiring means, not shown, to the external controlled means.

Figure 3:
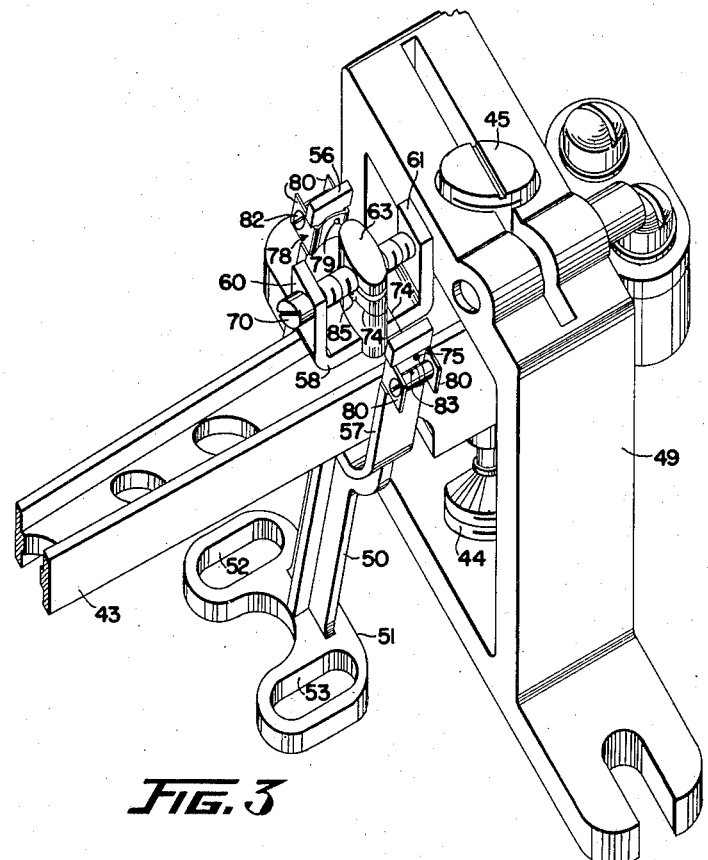
Figure 3 is a perspective view, on a larger scale, of the improved linkage between the rotor gimbal frame and the movable part of the potentiometer pickoff shown in Figures 1 and 2.
Figure 5:
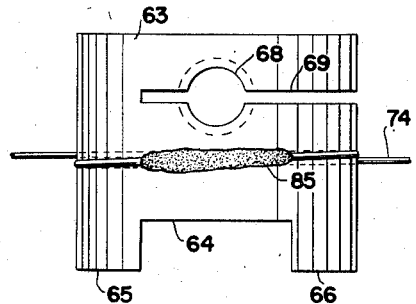
Figure 5 is another constructional detail showing connection of the wire to the spool in the drive linkage.

The means for connecting the gimbal block or rotor support 18 to the wiper arm assembly 42 or movable part of the potentiometer signal generator so that relative movement between the rotor support 18 and the base 10 of the gyroscope about the output axis defined by bearings 20 and 21 may be translated into relative movement between the two parts of the signal generator pickoff 39 about the pickoff axis defined by bearings 44 and 45 includes in part a U-shaped connecting link member 50 having a base portion 51 with a pair of oblong holes 52 and 53 therein (see Figure 3) through which extend suitable fastening means such as screws 54 and 55 for attaching connecting link 50 to the gimbal block 18. The oblong holes 52 and 53 permit the adjustment of connecting link 50 relative to gimbal block 18 in a direction parallel to the output axis defined by bearings 20 and 21. The U-shaped extremity of connecting link 50 has a pair of arms 56 and 57 which straddle a portion of arm 43 of the wiper assembly 42 intermediate the wipers 46 and 47 and the pivots 44 and 45. A U-shaped yoke member 58 has a stud portion 59 (shown in Figure 2) secured to arm member 43 of the wiper arm assembly 42. Yoke member 58 is arranged relative to arm member 43 of the wiper arm assembly so that the plane of the yoke as defined by its two arms 60 and 61 coincides with the longitudinal axis of the arm 43 of the wiper arm assembly 42. A spool member 63 shown in detail in Figure 5 has a recess 64 in one extremity thereof thus defining a pair of legs 65 and 66. Spool member 63 has a general oval-shaped cross-section as is shown in Figure 3 and is positioned on yoke member 58 with the legs 65 and 66 projecting along the sides of the bight portion of yoke member 58. A threaded aperture 68 is provided through the side of spool member 63 and a slot 69 in the side of spool 63 communicates with aperture 68 for locking purposes. A threaded rod or screw member 70 is journalled in suitable apertures, not shown, in U-shaped yoke member 58 and extends through the threaded aperture 68 in spool member 63. Rotation of the threaded rod member 70 relative to the U-shaped yoke member 58 causes the spool member 63 to be moved relative to the yoke member 58 and thus longitudinally along arm 43 of the wiper arm assembly 42.

Figure 4:
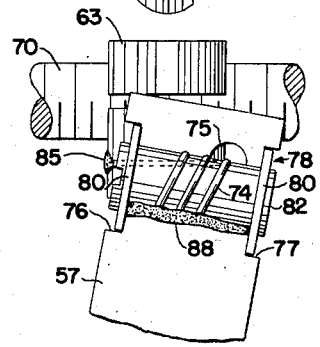
Figure 4 is a detail of the connection linkage.

The connection means between the rotor support or gimbal block 18 and the signal generator pickoff further includes a high tensile strength wire 74 stretched between the arms 56 and 57 of the connecting link 50 and wrapped around the spool 63. Each of arms 56 and 57 of connecting link 50 near the extremities thereof has a small aperture 75, shown best in Figure 4, through which wire 74 extends. The arms 56 and 57 are notched or recessed near their extremities as is shown in Figure 4 by reference numerals 76 and 77. Notches 76 and 77 each position a U-shaped spring bracket or clip 78, members 78 having a curved bight portion which abuts against the inside faces of arms 56 and 57 of connecting link 50 and which also have small apertures 79 therein as is shown in Figure 3, through which extends the wire 74. Arm portions 80 of the U-shaped clips 78 extend outwardly (away from arm 43) and have apertures therein through which extend key members 82. The wire 74 is first wrapped once around spool member 63 and secured thereto by suitable means such as by solder 85. The wire 74 is then inserted through small holes or apertures 83 in the key members 82. The key members 82 are then rotated relative to U-shaped clips 78 until all of the slack in wire 74 is taken up and the wire 74 is tensioned taut. When wire 74 has the proper tension in it, the keys 82 are fixed relative to U-shaped spring brackets 78 and arms 56 and 57 by suitable means such as soldering shown at 88 in Figure 4. The oval cross-section of spool 63 permits connection of wire 74 thereto without any localized operating stresses in the wire 74. This contributes to long trouble-free operation of the linkage.

From the foregoing description it will be understood that the rotation of gimbal block 18 relative to the base member 10 is transmitted to the signal generator pickoff through the connection means described above including the tensioned wire 74. In Figure 2 the dimension between the output axis defined by bearings 20 and 21 and the point of contact of the wire 74 to the signal generator pickoff wiper assembly 42 is identified by R. It will be noted in Figure 2 that the dimension between the pickoff axis defined by bearings 44 and 45 and the point of contact of the wire 74 to the wiper arm assembly 42 is identified by r. It will be understood that the mechanical angular amplification accomplished by the above described apparatus is equal to the ratio of R/r. The present invention provides a convenient method of changing the dimension r so that the mechanical angular amplification may be adjusted to the desired value. This is accomplished by moving the connecting link 50 relative to the gimbal block 18 and at the same time shifting the position of spool member 63 relative to the U-shaped yoke member 58, this latter step being easily done by rotating the threaded rod member 70 relative to the yoke 58.

From the above description, it will be understood that the apparatus provides a means of mechanically amplifying the gimbal angular movement so that the movable part of the pickoff rotates an angular amount several times that of the angular displacement of the gimbal relative to the base. The apparatus also provides a linkage between the gimbal assembly and the movable part of the pickoff which permits the pickoff axis to be at an angle to the output axis thus permitting a much smaller structure and housing than that which would be required if the pickoff axis was parallel to the output axis. As described above, the means for varying the dimension r permits fine variations of the mechanical amplification between gimbal rotation and pickoff rotation.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What we claim is:

1. Gyroscopic apparatus of the class described comprising a gyroscope rotor; means for rotating said rotor about a spin axis; a rotor support for rotatably supporting said rotor for rotation about said spin axis; a base; means supporting said rotor support on said base for rotation about an output axis with said output axis being substantially normal to said spin axis; a signal generator pickoff comprising a fixed part and a movable part with said movable part being pivotally mounted on said base for movement about a pickoff axis and with said pickoff axis being substantially normal to said output axis; and means for connecting said rotor support to said movable part of said signal generator so that relative movement between said rotor support and said base about said output axis is translated into relative movement between said two parts of said signal generator about said pickoff axis, said connection means comprising a U-shaped connecting link member having a pair of spaced arms and a base portion adjustably mounted on said rotor support and with said arms straddling a portion of said movable part of said pickoff, a U-shaped yoke secured to said portion of said movable part of said pickoff, a spool having an oval cross-section adjustably mounted on said yoke, and a wire tensioned between said arms of said link and wrapped around said spool.

2. Gyroscopic apparatus of the class decribed comprising a gyroscope rotor; means for rotating said rotor about a spin axis; a rotor support for rotatably supporting said rotor for rotation about said spin axis; a base; means supporting said rotor support on said base for rotation about an output axis with said output axis being at an angle to said spin axis; a signal generator pickoff comprising a pair of relatively movable parts with one of said parts being pivotally mounted for movement about a pickoff axis and with said pickoff axis being at an angle to said output axis; and means for connecting said rotor support to said one of said parts of said signal generator so that relative movement between said rotor support and said base about said output axis is translated into relative movement between said two parts of said signal generator about said pickoff axis, said connection means comprising a connecting link member having a pair of spaced arms and a base portion attached to said rotor support and with said arms straddling said one of said parts of said pickoff, a spool secured to said one of said parts of said pickoff, and a wire tensioned between said arms of said link and wrapped around said spool.

3. Gyroscopic apparatus of the class described comprising a gyroscope rotor; means for rotating said rotor about a spin axis; a rotor support for rotatably supporting said rotor for rotation about said spin axis; a base; means rotatably supporting said rotor support on said base for limited displacement of said rotor support relative to said base about an output axis with said output axis being substantially normal to said spin axis; means restraining said limited displacement; a potentiometer signal generator pickoff comprising a resistance part and a wiper part with said wiper member being pivotally mounted on said base for movement about a pickoff axis and with said pickoff axis being substantially normal to said output axis; and means for connecting said rotor support to said wiper part of said pickoff so that relative movement between said rotor support and said base about said output axis is translated into relative movement between said two parts of said pickoff about said pickoff axis, said connection means comprising connecting link means adjustably mounted on said rotor support and having a pair of spaced arms straddling said wiper part of said pickoff, adjustable means mounted on said wiper part, and a wire tensioned between said arms of said link means and connected to said adjustable means mounted on said wiper part.

4. Gyroscopic apparatus of the class described comprising a gyroscope rotor; means for rotating said rotor about a spin axis; a rotor support for rotatably supporting said rotor for rotation about said spin axis; a base; means supporting said rotor support on said base for rotation about an output axis with said output axis being at an angle to said spin axis; a signal generator pickoff comprising a fixed part and a movable part with said movable part being pivotally mounted on said base for movement about a pickoff axis and with said pickoff axis being at an angle to said output axis; and means for connecting said rotor support to said movable part of said signal generator so that relative movement between said rotor support and said base about said output axis is translated into relative movement between said two parts of said signal generator about said pickoff axis, said connection means comprising means mounted on said rotor support and extending adjacent to said movable part of said pickoff, and wire means tensioned from said rotor support mounted means to said movable part of said pickoff.

5. Gyroscopic apparatus of the class described comprising a gyroscope rotor; means for rotating said rotor about a spin axis; a rotor support for rotatably supporting said rotor for rotation about said spin axis; a base; means supporting said rotor support on said base for rotation about an output axis with said output axis being at an angle to said spin axis; a signal generator pickoff comprising a fixed part and a movable part with said movable part pivotally mounted on said base for movement about a pickoff axis and with said pickoff axis being at an angle to said output axis; and means including taut wire means for connecting said rotor support to said movable part of said signal generator so that relative movement between said rotor support and said base about said output axis is translated into relative movement between said two parts of said signal generator about said pickoff axis.

6. Apparatus of the class described comprising a sensitive instrument having a member rotatable about an output axis; signal generating pickoff means including a member rotatable about a pickoff axis with said pickoff axis being at an angle to said output axis; and connection means for connecting said instrument member to said pickoff member, said connection means comprising means mounted on said instrument member and extending adjacent to said pickoff member, means adjustably mounted on said pickoff member for movement relative to said pickoff axis, and wire means tensioned from said means on said instrument member to said adjustable means on said pickoff member.

7. Apparatus of the class described comprising a sensitive instrument having a member rotatable about an output axis; signal generating pickoff means including a member rotatable about a pickoff axis with said pickoff axis being at an angle to said output axis; and connection means for connecting said instrument member to said pickoff member, said connection means comprising means on said instrument member extending adjacent to said pickoff member, means adjustably mounted on said pickoff member for movement along an axis at an angle to said pickoff axis, and wire means tensioned from said means on said instrument member to said adjustable means on said pickoff member.

8. Apparatus of the class described comprising a sensitive instrument having a member rotatable about an output axis; pickoff means including a member rotatable about a pickoff axis with said pickoff axis being at an angle to said output axis; and connection means for connecting said instrument member to said pickoff member, said connection means comprising means mounted on said instrument member and extending adjacent to said pickoff member, a spool member having an oval cross-section adjustably mounted on said pickoff member for movement in a plane at an angle to said pickoff axis, and wire means tensioned from said means on said instrument member to said spool member on said pickoff member.

9. Apparatus of the class described comprising a sensitive instrument having a member rotatable about an output axis; pickoff means including a member rotatable about a pickoff axis with said pickoff axis being normal to said output axis; and connection means for connecting said instrument member to said pickoff member, said connection means comprising means mounted on said instrument member and extending adjacent to said pickoff member, a member having an oval cross-section adjustably mounted on said pickoff member for movement parallel to said output axis, and wire means tensioned from said means on said instrument member to said adjustable member on said pickoff member.

10. Apparatus of the class described comprising a sensitive instrument having a member rotatable about an output axis; signal generating pickoff means including a member rotatable about a pickoff axis with said pickoff axis being at an angle to said output axis; and connection means for connecting said instrument member to said pickoff member, said connection means comprising means on said instrument member extending adjacent to said pickoff member, means adjustably mounted on said pickoff member and spaced from said pickoff axis for movement in a plane perpendicular to said pickoff axis, and wire means tensioned from said means on said instrument member to said adjustable means on said pickoff member.

References Cited in the file of this patent

UNITED STATES PATENTS

| | | |
|---|---|---|
| 2,195,351 | Ziebolz | Mar. 26, 1940 |
| 2,480,574 | Hanna et al. | Aug. 30, 1949 |
| 2,690,014 | Draper et al. | Sept. 28, 1954 |
| 2,703,018 | Young | Mar. 1, 1955 |